US008081933B2

(12) United States Patent
Malaga et al.

(10) Patent No.: US 8,081,933 B2
(45) Date of Patent: Dec. 20, 2011

(54) RECONFIGURABLE AIRCRAFT RADIO COMMUNICATIONS SYSTEM

(75) Inventors: Alfonso Malaga, Sammamish, WA (US); Palaniappan Meiyappan, Bellevue, WA (US); Chad E. Wilson, Sammamish, WA (US); Jeffrey K. Hunter, Olathe, KS (US); Gregory Triplett, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 627 days.

(21) Appl. No.: 11/777,468

(22) Filed: Jul. 13, 2007

(65) Prior Publication Data
US 2009/0017777 A1  Jan. 15, 2009

(51) Int. Cl.
*H04B 1/38* (2006.01)
*H04W 4/00* (2009.01)

(52) U.S. Cl. ...................... 455/90.2; 455/431
(58) Field of Classification Search .................. None
See application file for complete search history.

(56) References Cited

U.S. PATENT DOCUMENTS

| | | | |
|---|---|---|---|
| 4,404,685 A | 9/1983 | Rogers | |
| 4,982,193 A | 1/1991 | Saul | |
| 5,280,636 A | 1/1994 | Kelley et al. | |
| 5,317,323 A | 5/1994 | Kennedy et al. | |
| 5,424,674 A | 6/1995 | Skudera, Jr. et al. | |
| 5,467,399 A | 11/1995 | Whitecar | |
| 5,548,839 A | 8/1996 | Caldwell et al. | |
| 5,606,740 A * | 2/1997 | Niratsuka et al. | 340/7.32 |
| 5,640,694 A | 6/1997 | Milton, Jr. | |
| 5,659,546 A | 8/1997 | Elder | |
| 5,694,356 A | 12/1997 | Wong et al. | |
| 5,771,396 A | 6/1998 | Arnold | |
| 5,822,366 A | 10/1998 | Rapeli | |
| 5,859,878 A | 1/1999 | Phillips et al. | |
| 5,861,831 A | 1/1999 | Murden et al. | |
| 5,870,402 A | 2/1999 | Kelley | |

(Continued)

FOREIGN PATENT DOCUMENTS
EP  1168637  1/2002
(Continued)

OTHER PUBLICATIONS

"Analog Devices", "Manufacturer Data Sheet", Mar. 26, 2001, Publisher: VersaCOMM Digital Converters.

(Continued)

*Primary Examiner* — Yuwen Pan
*Assistant Examiner* — Ayodeji Ayotunde
(74) *Attorney, Agent, or Firm* — Fogg & Powers LLC (57) ABSTRACT

A reconfigurable radio communications system is disclosed. The system comprises a digital data bus, a control bus, and first and second reconfigurable radio communication units responsive to the digital data bus and the control bus. Each of the first and second reconfigurable radio communication units further include a first and a second multifunction radio transceiver, with the first reconfigurable radio communication unit responsive to at least a first antenna, and the second reconfigurable radio communication unit responsive to at least a second antenna. Each of the first and the second multifunction radio transceivers of the first and the second reconfigurable radio communication units are operable to simultaneously transmit and receive data on at least two separate channels from different frequency bands. Within the system, one of the multifunction radio transceivers is automatically reconfigurable to maintain radio communication functions previously performed by a faulted multifunction radio transceiver.

19 Claims, 3 Drawing Sheets

U.S. PATENT DOCUMENTS

| | | | |
|---|---|---|---|
| 5,898,907 A | 4/1999 | Maruyama | |
| 5,909,193 A | 6/1999 | Phillips et al. | |
| 5,930,310 A | 7/1999 | Freeman | |
| 5,930,682 A | 7/1999 | Schwartz et al. | |
| 5,936,571 A | 8/1999 | Desjardins | |
| 6,069,583 A | 5/2000 | Silvestrin et al. | |
| 6,072,994 A * | 6/2000 | Phillips et al. | 455/84 |
| 6,075,808 A | 6/2000 | Tsujimoto | |
| 6,112,141 A | 8/2000 | Briffe et al. | |
| 6,144,331 A | 11/2000 | Jiang | |
| 6,151,354 A * | 11/2000 | Abbey | 375/211 |
| 6,153,947 A * | 11/2000 | Rockow et al. | 307/64 |
| 6,185,248 B1 | 2/2001 | Wiegand | |
| 6,185,434 B1 | 2/2001 | Hagstrom et al. | |
| 6,205,133 B1 | 3/2001 | Bexten | |
| 6,282,184 B1 | 8/2001 | Lehman et al. | |
| 6,307,497 B1 | 10/2001 | Leung et al. | |
| 6,334,051 B1 | 12/2001 | Tsurumi et al. | |
| 6,337,885 B1 | 1/2002 | Hellberg | |
| 6,384,681 B1 | 5/2002 | Bonds | |
| 6,415,001 B1 | 7/2002 | Li et al. | |
| 6,473,596 B1 | 10/2002 | Stamper et al. | |
| 6,477,359 B2 * | 11/2002 | Heppe et al. | 455/135 |
| 6,480,555 B1 | 11/2002 | Renard et al. | |
| 6,496,546 B1 | 12/2002 | Allpress et al. | |
| 6,574,459 B1 | 6/2003 | Kaminski et al. | |
| 6,639,537 B1 | 10/2003 | Raz | |
| 6,678,512 B1 | 1/2004 | Kaminski et al. | |
| 6,898,235 B1 | 5/2005 | Carlin et al. | |
| 6,914,950 B1 | 7/2005 | Luneau | |
| 6,944,475 B1 | 9/2005 | Campbell | |
| 7,016,674 B2 * | 3/2006 | Jones et al. | 455/431 |
| 7,200,377 B2 | 4/2007 | Whikehart et al. | |
| 7,605,757 B1 | 10/2009 | Gribble et al. | |
| 2002/0004411 A1 * | 1/2002 | Heppe et al. | 455/552 |
| 2002/0118784 A1 | 8/2002 | Teo et al. | |
| 2002/0173341 A1 | 11/2002 | Abdelmonem et al. | |
| 2002/0177446 A1 | 11/2002 | Bugeja et al. | |
| 2002/0193090 A1 | 12/2002 | Sugar et al. | |
| 2003/0072320 A1 | 4/2003 | Seo et al. | |
| 2003/0217300 A1 * | 11/2003 | Fukumori et al. | 713/300 |
| 2004/0145926 A1 * | 7/2004 | Kanouda et al. | 363/61 |
| 2004/0210932 A1 | 10/2004 | Mori | |
| 2005/0020238 A1 | 1/2005 | Eastman | |
| 2005/0089083 A1 | 4/2005 | Fisher | |
| 2006/0005055 A1 * | 1/2006 | Potega | 713/300 |
| 2006/0015674 A1 | 1/2006 | Murotake | |
| 2006/0135143 A1 | 6/2006 | Suematsu | |
| 2006/0194611 A1 | 8/2006 | Pasternak | |
| 2007/0150631 A1 | 6/2007 | Druke | |

FOREIGN PATENT DOCUMENTS

| | | |
|---|---|---|
| EP | 1168646 | 1/2002 |
| WO | 0225304 | 3/2002 |

OTHER PUBLICATIONS

"Four-Channel, 100 MSPS Digital Receive Signal Processor (RSP)", "AD6624A Data Sheet", 2002, pp. 1-39, Publisher: Analog Devices Inc.

Brannon et al., "Soft Radio runs into Hard Standards", "EE Times", Mar. 19, 2001.

Brannon, "Basics of Designing a Digital Radio Receiver (Radio 101)", "RF Microwave Wireless High Frequency", May 1995, pp. 1-10, Publisher: RF Cafe.

Brannon, "Designing a Super-Heterodyne Multi-Channel Digital Receiver", "Manufacturer Application Note", Jan. 1, 2000.

"Series III Avionics Pilot's Guide", 2000, Publisher: Chelton Avionics Inc.

McCann et al., "DSP Brings Base Station SDR Reality", Sep. 2004, pp. 50-56, Publisher: RF Design Magazine.

Satkunanathan et al., "Satellite-Based Guidance for Precision Approach and Landing of Commercial Aircraft", 1998, Publisher: GPS Solutions.

Oczak, "Navigation and Communication System", 2000.

O'Shea, "What's Up with Down Converters", Nov. 1, 2005, Publisher: www.eeproductcenter.com.

"VersaCOMM Digital Converters", "www.analog.com/VersaCOMM", 2000, Publisher: Analog Devices.

* cited by examiner

RECONFIGURABLE AIRCRAFT RADIO COMMUNICATIONS SYSTEM

BACKGROUND

Commercial Air Transport (CAT) requirements dictate that an aircraft that operates over any substantial water routes is required to have multiple radios to cover multiple frequency ranges. For example, CAT aircraft are required to be dispatched with at least two fully functioning very high frequency (VHF) range radios and at least one high frequency (HF) range radio dedicated for voice communications only. Moreover, to allow for data communications capability and also to avoid maintaining spare radios at every destination airport, CAT aircraft typically carry at least three VHF radios for line-of-sight and terminal area voice and data communications, and at least two HF radios for long-range over-the-horizon voice and data flight deck communications. The VHF and HF radios allocated for data communications can be used for voice communications when spare radios are not available. As the use of data communications to operate the aircraft more efficiently becomes more important, a means to be able to dispatch aircraft with both voice and data communications capability while keeping the number of installed radios and sparing stations to a minimum is highly desirable.

Currently, in order for the aircraft to be able to maintain its communications capability in the event of total loss of engine power, one VHF radio and one HF radio are powered from an emergency power supply. The radios powered from the aircraft's emergency power supply are typically designated as VHF1 and HF1. These designations allow a flight crew to identify which set of radios to use for voice communications between the aircraft and ground stations in the event of total loss of aircraft engine power. However, should the VHF1 (HF1) fail before a total loss of engine power supply event occurs, the aircraft will be left without a means to communicate with the ground or other aircraft.

For the reasons stated above and for other reasons stated below which will become apparent to those skilled in the art upon reading and understanding the present specification, there is a need in the art for improvements in aircraft radio communications systems.

SUMMARY

The following specification discusses a reconfigurable aircraft radio communications system. This summary is made by way of example and not by way of limitation. It is merely provided to aid the reader in understanding some aspects of at least one embodiment described in the following specification.

Particularly, in one embodiment, a reconfigurable aircraft radio communications system is provided. The system comprises a digital data bus, a control bus, and first and second reconfigurable radio communication units responsive to the digital data bus and the control bus. Each of the first and second reconfigurable radio communication units further include a first and a second multifunction radio transceiver, with the first reconfigurable radio communication unit responsive to at least a first antenna, and the second reconfigurable radio communication unit responsive to at least a second antenna. Each of the first and the second multifunction radio transceivers of the first and the second reconfigurable radio communication units are operable to simultaneously transmit and receive data on at least two separate channels from different frequency bands. Within the system, one of the multifunction radio transceivers is automatically reconfigurable to maintain radio communication functions previously performed by a faulted multifunction radio transceiver.

DRAWINGS

These and other features, aspects, and advantages are better understood with regard to the following description, appended claims, and accompanying drawings where:

The various described features are drawn to emphasize features relevant to the embodiments disclosed. Reference characters denote like elements throughout the figures and text of the specification.

DETAILED DESCRIPTION

The following detailed description describes at least one embodiment of a reconfigurable aircraft radio communications system with built in redundancy for improved dispatch reliability. Advantageously, a single multifunction radio within the reconfigurable radio communications system is capable of operation on two VHF channels and one HF channel to provide the minimum communications capability required to dispatch a CAT aircraft. The system discussed here reduces the number of radio communications line replaceable units required to dispatch the aircraft. In one implementation, software-controlled coordination of radio-frequency (RF) transceivers and digital data bus cross-connects between the radios provide a spare ("hot-standby") VHF radio function as a replacement in the event of a failure of any VHF radio function. Moreover, a spare HF radio function within the multifunction radio provides a similar "hot-standby" replacement capability in the event of a failure of a HF radio function or HF Coupler unit. Additional functions integrated into the multifunction radio discussed here include satellite communications (SATCOM) and similar combinations thereof.

The multifunction radios discussed here are within reconfigurable Radio Communication Unit (RCUs) with a substantially high fault tolerance level. The digital data bus cross-connects between the communications units allow for automatic reconfigurations between normal and the "hot-standby" radio functions. In addition, each multifunction radio can be powered from any available power supply (for example, a main power supply, as well as an emergency power supply). The system discussed here offers a higher aircraft dispatch reliability (that is, a lower aircraft down time) since the ability to reconfigure any of the radios allows the system to continue to provide 3 VHF functions and 2 HF functions with any one single failure and the minimum required 2 VHF functions and 1 HF function with up to two failures in the reconfigurable RCUs. The automatic reconfiguration discussed here allows any "surviving" VHF/HF radio function in a total loss of aircraft power to be configured as VHF1/HF1 without intervention by a flight crew.

In at least one embodiment, the reconfigurable aircraft radio communications system discussed here comprises a first and second reconfigurable RCU, a bi-directional digital data transfer bus and a control bus interconnection between the first and second RCU, and a first and second HF Coupler Unit. Each of the first and second reconfigurable RCUs further include a first and a second multifunction radio transceiver capable of transmitting or receiving on a VHF channel and transmitting or receiving on a HF channel simultaneously, with the first multifunction transceiver in the first reconfigurable RCU responsive to a first VHF antenna and the first HF Coupler Unit and the second multifunction transceiver in the first reconfigurable RCU responsive to a second VHF antenna, and the first multifunction transceiver in the second reconfigurable radio communication unit responsive to a third VHF antenna and the second HF Coupler Unit. Within the system, the VHF function in one of the multifunction radio transceivers is automatically reconfigurable to maintain three VHF radio communications functions when a failure in a VHF function in one of the other multifunction radio transceivers occurs. In addition, a HF function within each reconfigurable RCU is also automatically reconfigurable to maintain two HF radio communications functions when a failure in the HF function in the other radio communications unit or its associated HF Coupler Unit occurs. A set of antenna switches within each reconfigurable RCU provide the means to select and connect the active VHF functions and HF functions to the appropriate antenna. The digital data bus between each reconfigurable RCU provides the means to re-route digital voice and data samples to the active VHF and HF functions. The control bus between radio communications units provides the means for coordination and control of the reconfiguration of the system.

Figure 1:
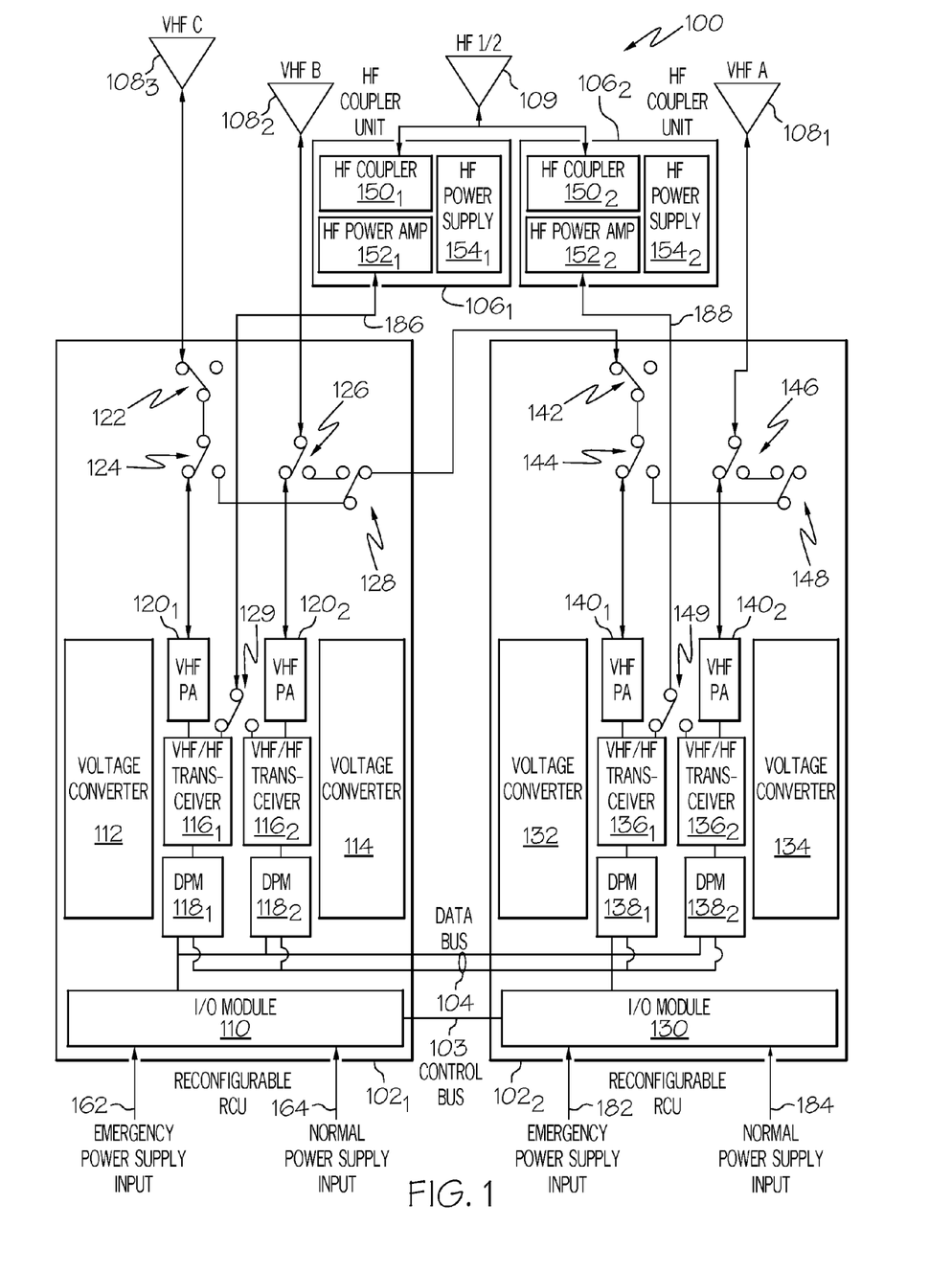
FIG. 1 is a block diagram of a reconfigurable aircraft radio communications system.

FIG. 1 is a block diagram of a reconfigurable aircraft radio communications system 100. In the example embodiment of FIG. 1, the system 100 comprises at least two reconfigurable RCUs $102_1$ and $102_2$ interconnected by means of a control bus 103 and a digital data transfer bus 104 and HF Coupler Units $106_1$ and $106_2$. In one implementation, the HF Coupler Units $106_1$ and $106_2$ are interconnected to the reconfigurable RCUs $102_1$ and $102_2$ by means of RF coax and control cables 186 and 188, respectively. In the example embodiment of FIG. 1, each of the reconfigurable RCUs 102 sends and receives communication signals by means of VHF antennas $108_1$ to $108_3$ (shown in FIG. 1 as VHF A, VHF B, and VHF C, respectively), HF Coupler Units $106_1$ or $106_2$ and HF antenna 109 (shown in FIG. 1 as HF ½). In the example embodiment of FIG. 1, each of the VHF antennas 108 provides the means to transmit voice or data signals on one VHF channel at a time or to receive voice or data signals on at least one VHF channel. In one implementation, each HF Coupler Unit 106 matches the impedance of the HF antenna 109 at a selected HF channel to 50 Ohms and provides the means to transmit voice or data signals on one HF channel or to receive voice or data signals on at least one HF channel.

As shown in FIG. 1, each of the reconfigurable RCUs 102 comprise multifunction radio transceivers $116_1$ and $116_2$ ($136_1$ and $136_2$) communicatively coupled to at least one of the VHF antennas 108 through antenna switches 122 to 128 (142 to 148) and to an HF antenna 109 through HF Coupler Units $106_1$ and $106_2$ through antenna switches 129 (149). As discussed below, each of the multifunction radio transceivers 116 (136) are operable to simultaneously transmit or receive voice or data signals on one VHF channel and one HF channel. In the example embodiment of FIG. 1, the multifunction radio transceivers $116_1$ and $116_2$ ($136_1$ and $136_2$) are communicatively coupled to a VHF power amplifier (PA) $120_1$ to $120_2$ ($140_1$ to $140_2$), respectively, and HF power amplifiers $152_1$ and $152_2$, respectively. The system 100 further comprises digital processing modules (DPMs) $118_1$ and $118_2$ ($138_1$ and $138_2$) communicatively coupled to the multifunction radio transceivers $116_1$ and $116_2$ ($136_1$ and $136_2$), respectively. In addition, an input/output (I/O) module 110 (130) in reconfigurable radio communications unit $102_1$ ($102_2$) is communicatively coupled to the DPMs $118_1$, $118_2$, $138_1$ and $138_2$ through the digital data bus 104. The I/O modules 110 and 130 are communicatively coupled through a control bus 103.

As shown in FIG. 1, each of the HF coupler units 106 further comprise HF couplers $150_1$ and $150_2$ and HF power supplies $154_1$ and $154_2$. In the example embodiment of FIG. 1, at least one of the multifunction radio transceivers 116 (136) is connected to the HF coupler units $106_1$ and $106_2$ through the antenna switch 129 (149). In alternate implementations, the HF input/output of at least one multifunction radio transceiver 116 (136) from each of the reconfigurable RCUs 102 is connected to a single HF coupler unit 106 in aircraft that do not fly routes requiring high in-flight availability of the HF radio functions.

As shown in FIG. 1, each of the multifunction radio transceivers 116 (136) includes at least one VHF transceiver and at least one HF transceiver. Alternate implementations of the multifunction radio transceivers 116 (136) of FIG. 1 include a SATCOM transceiver, and other similar aircraft communications functions. In the example embodiment of FIG. 1, each of the multifunction radio transceivers 116 (136) is capable of simultaneous operation on the at least two separate frequency band channels. Between each of the reconfigurable radio communications units 102, the system 100 supports simultaneous reception of multiple VHF channels (for example, three VHF voice channels or two VHF voice channels and one VHF data channel) and multiple HF channels (for example, two HF voice channels or one HF voice channel and one HF data channel).

In the example embodiment of FIG. 1, the digital processing modules $118_1$ and $118_2$ ($138_1$ and $138_2$) generate various RF transmit waveforms and demodulate and decode various digitized RF received waveforms. For example, each of the digital processing modules 118 (138) process one VHF simplex transmit and receive channel and one HF simplex transmit and receive channel simultaneously. Moreover, the I/O module 110 (130) manages the transfer of data between each of the reconfigurable radio communication units 102. In one implementation, the I/O module 110 (130) simultaneously outputs and accepts a plurality of analog audio voice channels and digital data channels using a high-speed interface such as an Aeronautical Radio, Incorporated (ARINC) avionics interface or an avionics full-duplex switched ethernet (AFDX) interface. For example, the I/O module 110 (130) communicates with at least one ARINC avionics interface to an aircraft radio management panel (RMP) for radio tuning and at least one system interface to an aircraft central maintenance system (CMS), a flight warning system (FWS), and other aircraft subsystems. In the example embodiment of FIG. 1, each of the separate VHF antennas $108_1$ to $108_3$ are connected to three out of the four multifunction radio transceivers 116 (136) at any one time. The fourth multifunction radio transceiver 116 (136) and its associated VHF PA 120 (140) and DPM 118 (138) are a "hot-standby" spare for any of the three operational multifunction radio transceivers 116 (136), VHF PAs 120 (140) and DPMs 118 (138). The I/O modules 110 (130) control and coordinate the assignment of the radio functions and can assume each other's functions should one of them fail as described below.

In operation, the multifunction radio transceivers 116 (136) and associated DPMs 118 (138) send and receive messages between an aircraft and a plurality of ground stations on at least one VHF channel and one HF channel simultaneously. Once a fault is detected in the multifunction radio transceiver $116_1$ (or its associated DPM $118_1$ or VHF PA $120_1$), the reconfigurable radio communications units $102_1$ and $102_2$ use the control bus 103 to reconfigure the "hot-standby" multifunction radio transceiver $136_2$ and its associated DPM $138_2$ and VHF PA $140_2$ to perform the VHF and HF functions previously assigned to the faulted multifunction radio transceiver $116_1$. As instructed by the I/O modules 110 (130), the DPM $138_2$ automatically routes the received VHF and HF data to the I/O module 110 through the digital data bus 104 and delivers transmit VHF and HF data sent by the I/O module 110 to the transceiver $136_2$ to maintain the radio functions previously assigned to the failed transceiver $116_1$ or the failed DPM $118_1$ or the failed VHF PA $120_1$ using at least one of the VHF antennas 108 and the HF antenna 109. In one implementation, the digital bus 104 is a digital crosstalk bus that automatically routes the communication data within the system 100 and does not require a flight crew to keep track of which radio transceiver 116 (136) is being used for a particular VHF or HF function. In the event of a failure of any of the multifunction radio transceivers 116 (136) connected to the HF coupler unit $106_1$ ($106_2$) or associated DPMs 118 (138), the unused HF transceiver from a second multifunction radio transceiver 116 (136) and its associated DPM 118 (138) may be switched in and connected to the HF coupler unit $106_1$ ($106_2$). As discussed above, the fourth multifunction radio transceiver 116 (136), the fourth DPM 118 (138) and the fourth VHF PA 120 (140) may be designated as the "hot-standby" spare and connected to a VHF antenna 108 when any of the other multifunction radio transceivers 116 (136), the DPMs 118 (138) or the VHF power amplifiers 120 (140) experience a failure condition.

Since the system 100 is configured to operate with three VHF radio functions and two HF radio functions, the system 100 will tolerate a failure in one of the multifunction radio transceivers 116 (136) or the DPMs 118 (138) that support a VHF and a HF radio function or a fault in the VHF PA 120 (140), or the HF Coupler Unit 106 or the I/O module 110 (130) without loss of any of the radio functions of the system 100. For example, a failure that does not result in the loss of any radio functions of the system 100 will not be reported to the flight crew. Failures in two multifunction radio transceivers 116 (136) result in loss of one VHF function (that is, degraded operation of the system 100). The loss of the VHF function is reported to the flight crew.

Reconfiguration of Radio Functions

As discussed above, the "hot-standby" multifunction radio transceiver (for example, any of the multifunction radio transceivers $116_1$ and $116_2$ ($136_1$ and $136_2$)) is automatically reconfigured to maintain the availability of a radio function during a communications fault in at least one of the reconfigurable RCUs 102. The I/O modules 110 and 130 manage the reconfiguration using the digital data bus 104 to route data to and from each of the multifunction radio transceivers 116 within the system 100. The switches 122 to 128 (142 to 148) are reconfigured to route the radio frequency (RF) signal for the multifunction radio transceiver 116 (136) configured as the first multifunction radio transceiver to one of the VHF antenna 108.

When the system is operating without any detected faults, it is desirable to rotate the "hot-standby" assignment among multifunction transceivers to avoid latent faults. An example of how to accomplish this is as follows. Once any of the VHF radio functions VHF A, VHF B or VHF C is commanded to change frequencies, the VHF function tuned to the new frequency is assigned to the previously "hot-standby" multifunction radio transceiver 116 (136) and the multifunction radio transceiver 116 (136) previously performing the VHF radio function is taken off-line and is assigned the "hot-standby" function. The DPM 118 (138) associated with the new "hot-standby" can then perform self-test of new "hot-standby" transceiver 116 (136) and VHF PA 120 (140) to ensure that these modules are fault-free and available for re-assignment. The use of the fourth multifunction radio transceiver 116 (136) as the "hot-standby" for each of the other operable multifunction radio transceivers 116 (136) improves the availability of VHF voice and data functions.

To avoid the loss of multiple functions due to a failure in the I/O module 110 (130) of the system 100, the digital bus 104 transfers data that would normally be processed by the failed I/O module 110 (130) for processing by the "healthy" I/O module 130 (110). For example, the reconfigurable radio communications unit $102_1$ delivers and receives data from the I/O module 130 via the digital bus 104 if the I/O module 110 fails. Similarly, the reconfigurable radio communications unit $102_2$ delivers and accepts data from the I/O module 110 if the I/O module 130 fails.

In one implementation, when a self-test of the system 100 indicates that the reconfigurable radio communications units 102 have no internal failures, each of the multifunction radio transceivers 116 (136) are assigned to perform a default VHF function. After power up, the three on-line multifunction radio transceivers 116 (136) and power amplifiers 120 (140) are monitored by the reconfigurable radio communications units 102 for potential faults. For example, a transceiver failure may be detected by monitoring the transmitted and reflected power during each key event. In one implementation, these measurements are averaged over a substantial time period to avoid any nuisance fault (that is, false) alarms. Therefore, if the transceiver failure occurs in the middle of a transmission, there will be a loss of transmitted signal while the failure is confirmed. In one implementation, the "hot-standby" transceiver 116 (136) continues to periodically perform the self-test during operation of the system 100.

Power Management Under Emergency Supply Conditions

To ensure that emergency radio functions remain operational after a system fault occurs (for example, a loss of normal aircraft power), each of the reconfigurable RCUs 102 further include two aircraft power supply inputs, an emergency power supply input 162 (182), a normal power supply input 164 (184), and power supply voltage converters 112 and 114 (132 and 134). Each power supply voltage converter 112 (132) and 114 (134) generates the voltages needed to power the reconfigurable RCUs $102_1$ ($102_2$) from either the emergency power supply input 162 (182) or the normal power supply input 164 (184). In the example embodiment of FIG. 1, the power supply voltage converter 114 (134) generates voltages from the emergency power supply input 162 (182) to the reconfigurable RCU $102_1$ ($102_2$). For example, the power supply voltage converter 114 (134) provides the voltages needed to operate the multifunction radio transceiver $116_1$ ($136_1$) and associated VHF PA $120_1$ ($140_1$), DPM 181 ($138_1$) and I/O module 110 (130). In this example, the multifunction radio transceiver $116_1$ ($136_1$) has been assigned VHF1 and HF1 functions. Additionally, the power supply voltage converter 112 (132) generates voltages from the emergency power supply 162 (182) and provides the voltages needed to operate the multifunction radio transceiver $116_2$ ($136_2$), the VHF PA $120_2$ ($140_2$), and the DPM $118_2$ ($138_2$). In one implementation, each of the power supply voltage converters 112 and 114 (132 and 134) operate with a 28 VDC power supply input.

In one implementation, the power supply voltage converter 112 (132) provides power to the multifunction radio transceiver 116$_1$ (136$_1$), the VHF power amplifier 120$_1$ (140$_1$), the DPM 118$_1$ (138$_1$) and the I/O module 110. In this same implementation, the power supply voltage converter 114 (134) provides power to the multifunction radio transceiver 116$_2$ (136$_2$), the VHF power amplifier 120$_2$ (140$_2$), and the DPM 118$_2$ (138$_2$). Moreover, the VHF1 and HF1 radio functions are automatically assigned to the multifunction radio transceiver 116 (136) that is powered from the power supply voltage converters 112 and 114 (132 and 134) that receive power from the emergency power supply input 162 (182). As discussed in further detail below with respect to FIG. 3, the VHF1 and HF1 functions remain operational when an "electrical emergency power mode" indication is received and any other communications functions that are powered from the normal power supply input 164 (184) are shut down.

For example, when the "electrical emergency power mode" indication is received in a total engine flame out (TEFO) condition, the reconfiguration and fault detection capability discussed here and with respect to FIG. 3 below assigns the HF1 and VHF1 functions to appropriate multifunction radio transceivers 116 (136) in at least one of reconfigurable RCUs 102 prior to the loss of aircraft power. To ensure that the VHF1 function remains available when the TEFO condition occurs, the VHF1 function is assigned to at least one of the multifunction radio transceivers 116 (136), the VHF power amplifiers 120 (140), the DPMs 118 (138) and the I/O modules 110 (130) powered by one of the power supply voltage converters 112 and 114 (132 and 134) receiving power from the emergency power supply inputs 162 (182). In this example condition, at least one VHF function remains operational in each of the reconfigurable RCUs 102 and any remaining VHF functions are powered down. Moreover, the power management discussed here ensures that the electrical load presented by the reconfigurable RCUs 102 powered by the emergency power supply input 162 (182) in the TEFO condition substantially equivalent to a load presented by one VHF radio communications function in current aircraft installations.

Alternate Architectures

Figure 2:
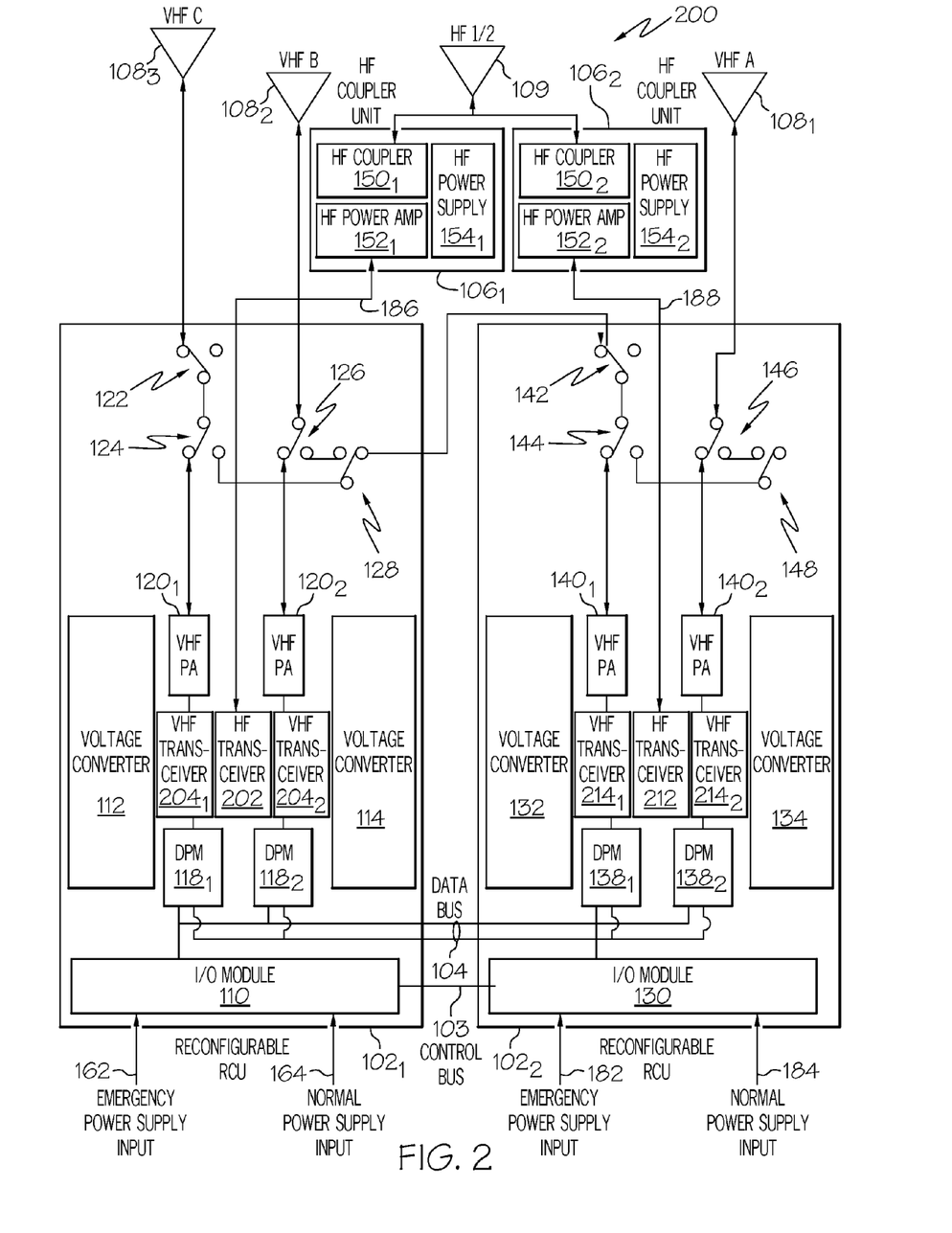
FIG. 2 is a block diagram of a reconfigurable aircraft radio communications system.

FIG. 2 is a reconfigurable aircraft radio communications system 200, similar to the system 100 of FIG. 1. Within each of the reconfigurable RCUs 102 of FIG. 2, the system 200 comprises a separate HF radio transceiver 202 (212) and separate VHF radio transceivers 204$_1$ and 204$_2$ (214$_1$ and 214$_2$). In the example embodiment of FIG. 2, each of the HF radio transceivers 202 and 212 comprise a wideband HF transceiver to support simultaneous reception on at least two HF channels.

The reconfigurable RCUs 102$_1$ and 102$_2$ operate simultaneously on two VHF channels and one HF channel without restriction. For example, the VHF radio transceiver 204$_1$ uses the VHF antenna 108$_3$, the VHF radio transceiver 204$_2$ uses the VHF antenna 108$_2$, and the HF radio transceiver 202 uses the HF antenna 109 to communicate on at least two radio channel frequencies simultaneously. Moreover, the reconfigurable aircraft radio communications system discussed here is capable of simultaneous transmission on a first VHF transceiver 214 (204) and reception on second and third VHF transceivers 204 (214) that are not connected to the same VHF antenna 108 as the first multifunction radio transceiver 214 (204).

Fault Detection and Configuration Logic

Figure 3:
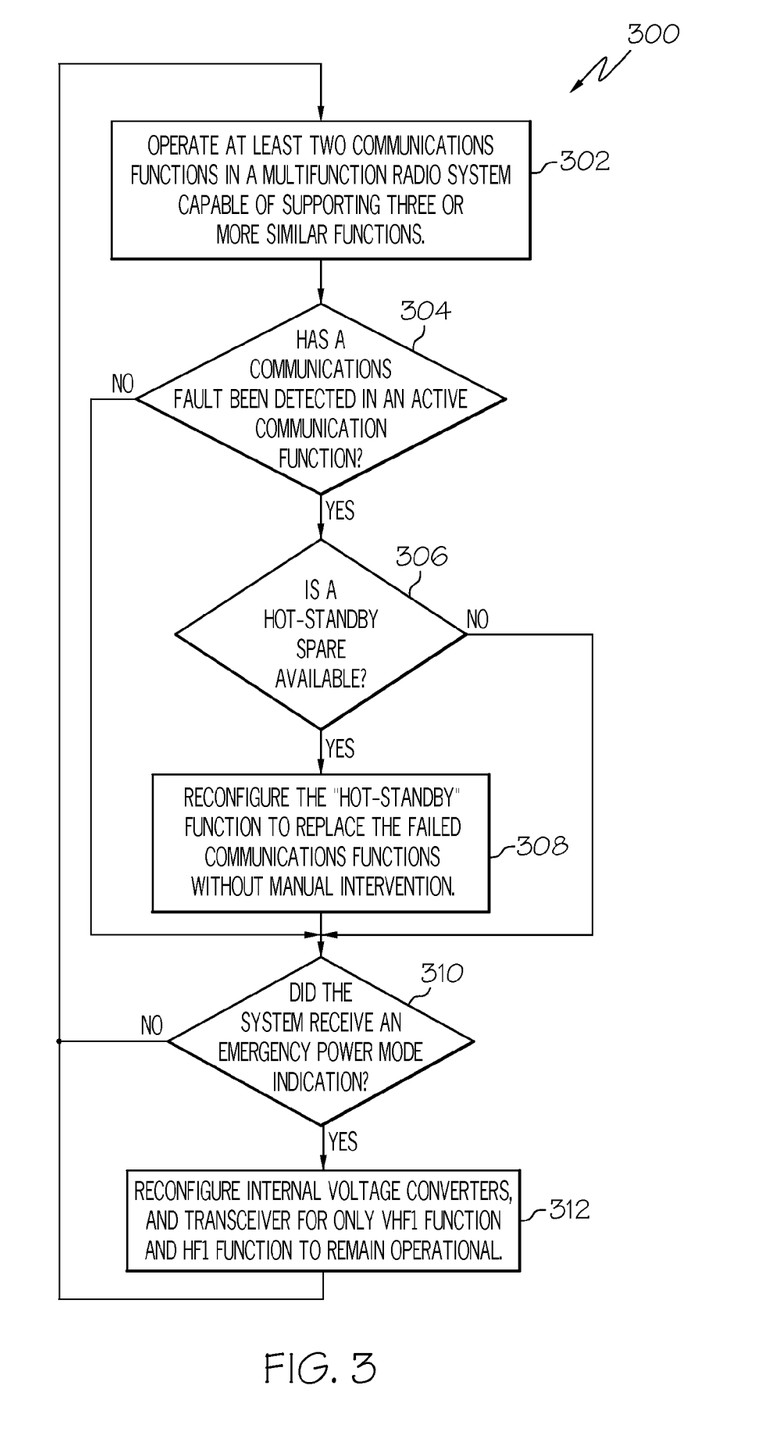
FIG. 3 is a flow diagram of a method for maintaining radio communications in a reconfigurable aircraft radio communications system.

FIG. 3 is a flow diagram of a method 300 for maintaining radio communications in a reconfigurable aircraft radio communications system, similar to the systems described above in FIGS. 1 and 2. The method of FIG. 3 addresses detecting a communications fault in a first multifunction radio transceiver, a DPM, a VHF PA, or an HF Coupler Unit in the reconfigurable radio communications system. The reconfigurable radio communications system comprises at least one reconfigurable radio communications unit configured to include at least two communications functions capable of simultaneous operation on at least two individual channel frequencies. Once the communications fault is detected, a second set of the multifunction radio transceiver, the DPM, the VHF PA and (optionally) the HF Coupler Unit are automatically reconfigured to continue operating the at least two communications functions without manual intervention.

At block 302, the at least two communications functions operate in a multifunction radio system capable of supporting three or more similar communications functions (for example, a multifunction radio transceiver and its associated DPM, VHF PA and HF Coupler Unit on the at least two individual channel frequencies). In one implementation, each of the communications functions is periodically monitored during operation. If a communications fault is detected in an active communication function (for example, the multifunction radio transceiver or its associated DPM, VHF PA or HF Coupler Unit at block 304, and a "hot-standby" spare is available (block 306), the "hot-standby" function is reconfigured to replace the failed communications functions without manual intervention (block 308). When the system receives an emergency power mode indication (block 310), the system is reconfigured to operate under emergency supply conditions by managing the assignment of emergency VHF1 and HF1 functions to the internal power supply voltage converters and the at least one multifunction radio transceiver that remain operational when the system experiences a loss of normal electrical power (block 312). In one implementation, only the emergency VHF1 and HF1 functions remain operational and all other (normal) VHF and HF functions are turned off.

While the embodiments disclosed have been described in the context of a reconfigurable radio communications system, apparatus embodying these techniques are capable of being distributed in the form of a machine-readable medium of instructions and a variety of program products that apply equally regardless of the particular type of signal bearing media actually used to carry out the distribution. Examples of machine-readable media include recordable-type media, such as a portable memory device; a hard disk drive (HDD); a random-access memory (RAM); a read-only memory (ROM); transmission-type media, such as digital and analog communications links; and wired or wireless communications links using transmission forms, such as (for example) radio frequency and light wave transmissions. The variety of program products may take the form of coded formats that are decoded for actual use in a particular reconfigurable radio communications system by a combination of digital electronic hardware and software, with the software residing in a programmable processor (for example, a special-purpose processor or a general-purpose processor in a computer).

At least one embodiment disclosed herein can be implemented by computer-executable instructions, such as program product modules, which are executed by the programmable processor. Generally, the program product modules include routines, programs, objects, data components, data structures, and algorithms that perform particular tasks or implement particular abstract data types. The computer-executable instructions, the associated data structures, and the program product modules represent examples of executing the methods disclosed herein.

This description has been presented for purposes of illustration, and is not intended to be exhaustive or limited to the embodiments disclosed. Variations and modifications may occur, which fall within the scope of the following claims.

What is claimed is:

1. A reconfigurable radio communications system, comprising:
   a digital data bus;
   a control bus;
   a first reconfigurable radio communication unit responsive to the digital data bus and the control bus, the first reconfigurable radio communication unit including a first and a second multifunction radio transceiver responsive to at least a first antenna, the first reconfigurable radio communication unit further comprising:
      a first power supply voltage converter configured to derive voltages from a first normal power supply and a first emergency power supply; and
      a second power supply voltage converter configured to derive voltages from the first normal power supply and the first emergency power supply, the first emergency power supply remaining operable when the first normal power supply fails;
   a second reconfigurable radio communication unit responsive to the digital data bus and the control bus, the second reconfigurable radio communication unit including a first and a second multifunction radio transceiver responsive to at least a second antenna, the second reconfigurable radio communication unit further comprising:
      a third power supply voltage converter configured to derive voltages from a second normal power supply and a second emergency power supply; and
      a fourth power supply voltage converter configured to derive voltages from the second normal power supply and the second emergency power supply,
   the second emergency power supply remaining operable when the second normal power supply fails;
   wherein each of the first and the second multifunction radio transceivers of the first and the second reconfigurable radio communication units are operable to simultaneously transmit and receive data on at least two separate channels from different frequency bands; and
   wherein one of the multifunction radio transceivers is automatically reconfigurable to maintain radio communication functions previously performed by a faulted multifunction radio transceiver.

2. The system of claim 1, further comprising:
   at least one high frequency coupler unit communicatively coupled to the first or the second multifunction radio transceivers in each of the reconfigurable radio communication units; and
   a high frequency antenna, communicatively coupled to the coupler unit, operable to transmit and receive data on at least one high frequency band channel of the first or the second multifunction radio transceivers in each of the reconfigurable radio communication units.

3. The system of claim 1, wherein the digital bus is a digital crosstalk bus operable to transfer transmit and receive data between each of the multifunction radio transceivers within the system.

4. The system of claim 1, wherein each of the multifunction radio transceivers comprises a high frequency radio transceiver and a very high frequency radio transceiver.

5. The system of claim 1, wherein each of the multifunction radio transceivers comprises at least one of a high frequency radio transceiver, a very high frequency radio transceiver, and a satellite communications radio transceiver.

6. The system of claim 1, wherein each of the reconfigurable radio communication units further comprise at least one antenna switch to route the radio frequency signals for the multifunction radio transceiver, configured as the first multifunction radio transceiver, to the at least one first antenna or the at least one second antenna.

7. The system of claim 1, wherein each of the reconfigurable radio communication units further comprise:
   at least one digital processing module communicatively coupled to the first multifunction radio transceiver; and
   an input/output module communicatively coupled to the at least one digital processing module through the digital bus to transfer transmit and receive data between each of the multifunction radio transceivers.

8. The system of claim 7, wherein at least one of the input/output modules coordinates and controls future reconfigurations of each of the operable multifunction radio transceivers.

9. A reconfigurable aircraft radio communications system, comprising:
   at least two reconfigurable radio communications units coupled to a digital crosstalk bus, each of the reconfigurable radio communications units comprising:
      at least two multifunction radio transceivers operable to simultaneously transmit and receive radio dispatches between an aircraft and a plurality of ground stations on at least two separate frequency band channels with at least a first antenna and a second antenna;
      at least two digital processing modules, each of the digital processing modules communicatively coupled to a respective one of the multifunction radio transceivers;
      at least two power amplifiers, each of the power amplifiers communicatively coupled to a respective one of the multifunction radio transceivers;
      an input/output module, communicatively coupled to at least one of the digital processing modules, configured to manage communication data between each of the reconfigurable radio communication units;
      a first power supply voltage converter coupled to one of the digital processing modules, one of the multifunction radio transceivers, one of the power amplifiers, and the input/output module, wherein the first power supply voltage converter is configured to derive voltages from a normal power supply and an emergency power supply; and
      a second power supply voltage converter coupled to at least one other of the digital processing modules, at least one other of the multifunction radio transceivers, at least one other of the power amplifiers, and the input/output module, wherein the second power supply voltage converter is configured to derive voltages from the normal power supply and the emergency power supply;
   wherein the system automatically reconfigures at least one of the multifunction radio transceivers designated as a standby multifunction radio transceiver once a fault in at least one of the reconfigurable radio communications units is detected; and wherein the system automatically reconfigures at least one of the reconfigurable radio communications units to operate under emergency supply conditions when a system emergency power mode indication occurs.

10. The system of claim 9, further comprising at least one high frequency coupler unit communicatively coupled to at least one of the multifunction radio transceivers in each of the reconfigurable radio communication units.

11. The system of claim 9, wherein each of the multifunction radio transceivers operate simultaneously on at least one high frequency channel and at least two very high frequency channels.

12. The system of claim 9, wherein the normal power supply in each of the reconfigurable radio communications units supplies power to each of the multifunction radio transceivers, each of the digital processing modules, each of the power amplifiers, and the input/output module.

13. The system of claim 9, wherein each of the reconfigurable radio communication units further comprise at least one antenna switch to route the radio dispatch for a multifunction radio transceiver, configured as the standby multifunction radio transceiver, to the at least one first antenna or the at least one second antenna.

14. The system of claim 9, wherein each of the multifunction radio transceivers is at least one of a high frequency radio transceiver or a very high frequency radio transceiver.

15. A method for maintaining radio communications in a reconfigurable aircraft radio communications system, the method comprising:

detecting a communications fault in a reconfigurable radio communications unit with at least one multifunction radio transceiver, the reconfigurable radio communications unit configured to include at least two communications functions capable of simultaneous operation on at least two channel frequencies, the reconfigurable radio communication unit comprising:

a first power supply voltage converter configured to derive voltages from a normal power supply and an emergency power supply; and a second power supply voltage converter configured to derive voltages from the normal power supply and the emergency power supply;

once the communications fault is detected, automatically reconfiguring a hot-standby multifunction radio transceiver in the reconfigurable radio communications unit to continue operating the at least two communications functions on the at least two channel frequencies without manual intervention; and if a system emergency power mode indication occurs, reconfiguring the communications system to operate under emergency supply conditions.

16. The method of claim 15, wherein detecting the fault in the reconfigurable radio communications unit further comprises periodically monitoring each of the communications functions during operation.

17. The method of claim 15, wherein automatically reconfiguring the hot-standby multifunction radio transceiver further comprises:

controlling future reconfigurations of any remaining multifunction radio transceivers from an input/output module; and reporting the fault when more than two failures of any of the multifunction radio transceivers in the communications system occur.

18. The method of claim 15, wherein reconfiguring the communications system to operate under emergency supply conditions further comprises managing the assignment of power supply voltage converters and the at least two communications functions to the at least one multifunction radio transceiver that remains operational when the system experiences a loss of normal electrical power input.

19. A non-transitory computer readable medium having computer-executable instructions for performing a method for maintaining radio communications in a reconfigurable radio communications system according to claim 15.

* * * * *